M. M. DAVIS.
DEVICE FOR PREVENTING INDUCTION IN ELECTRICAL CONDUCTORS.
APPLICATION FILED JULY 17, 1909.
955,142.
Patented Apr. 19, 1910.
2 SHEETS—SHEET 1.
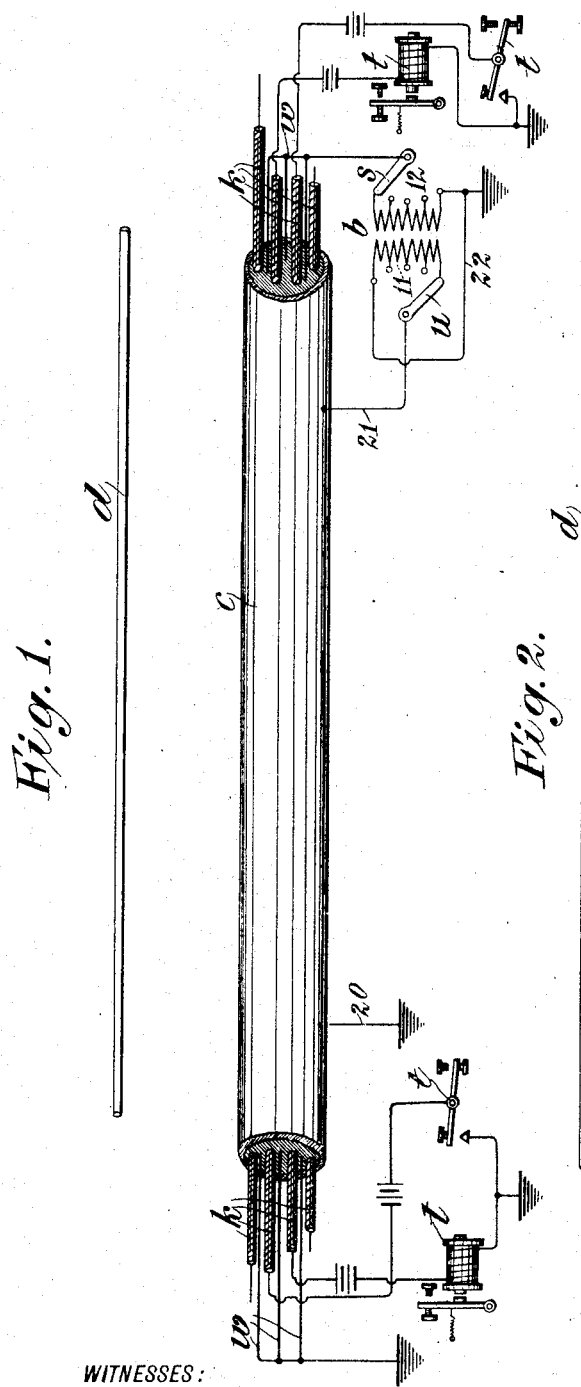
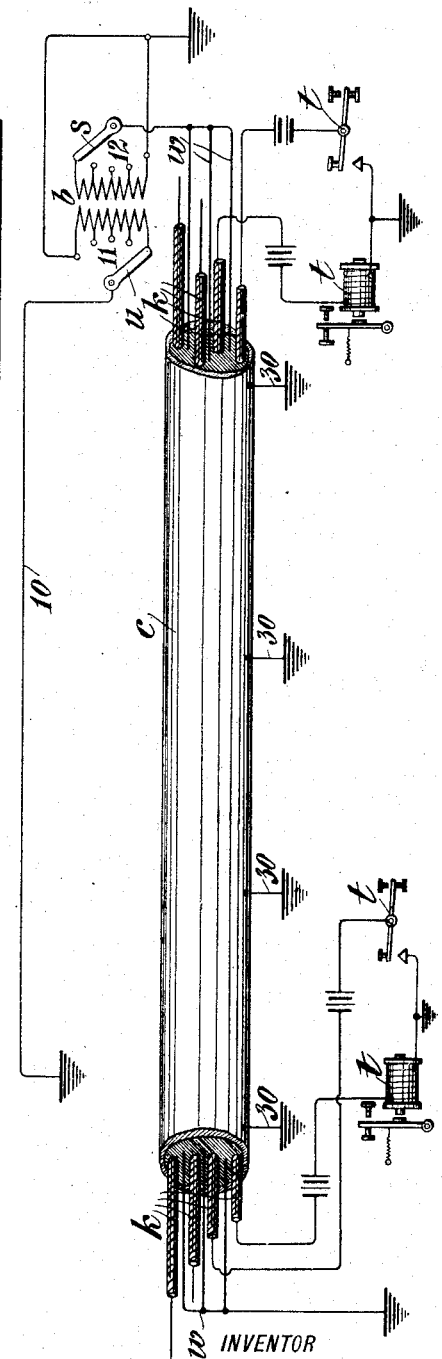

M. M. DAVIS.
DEVICE FOR PREVENTING INDUCTION IN ELECTRICAL CONDUCTORS.
APPLICATION FILED JULY 17, 1909.
955,142.
Patented Apr. 19, 1910.
2 SHEETS—SHEET 2.
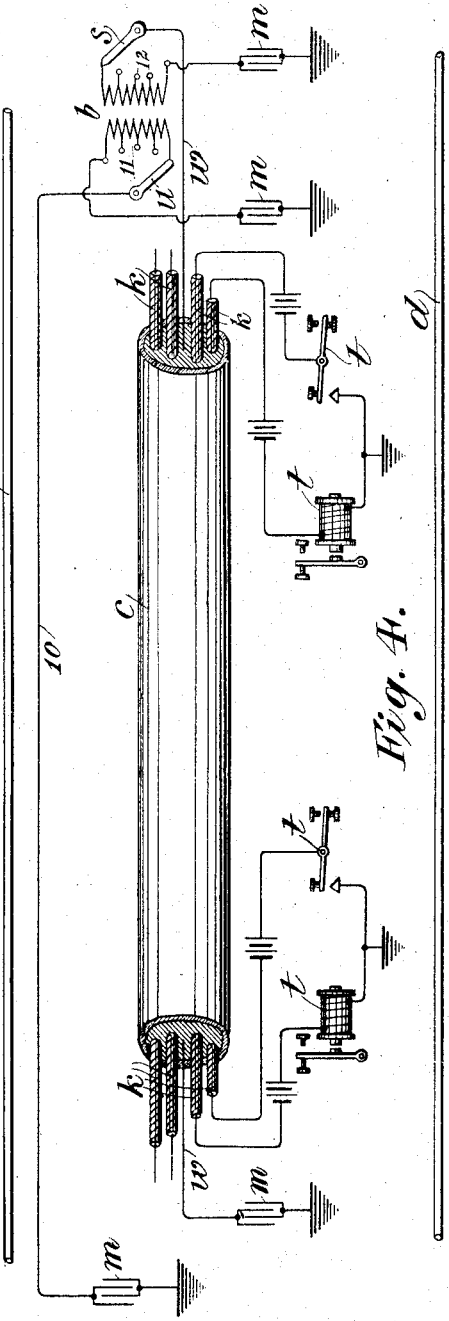
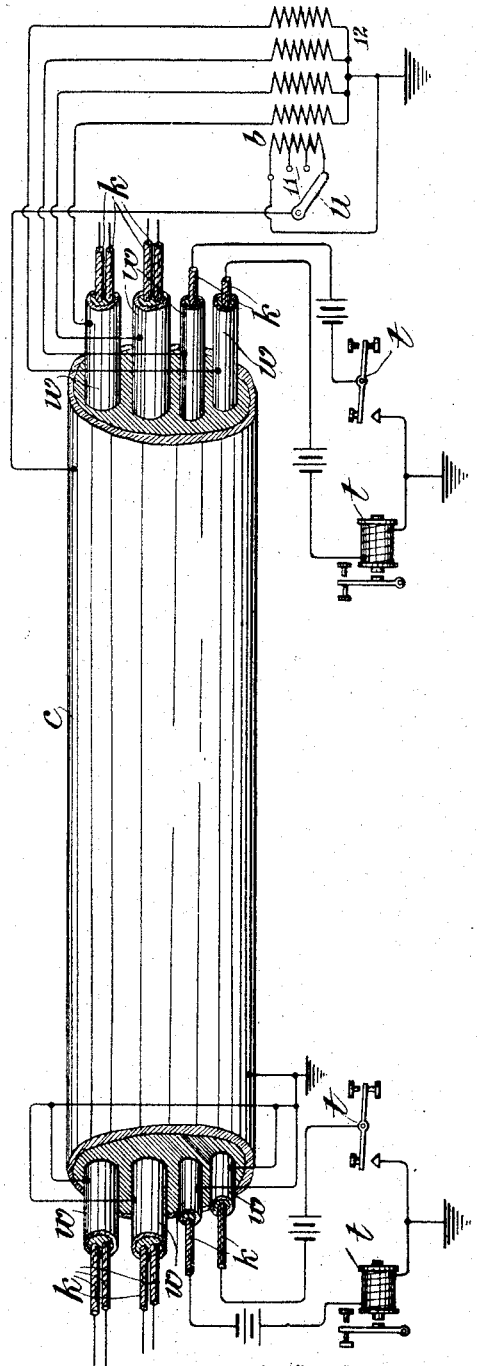
WITNESSES:
INVENTOR
ATTORNEY

UNITED STATES PATENT OFFICE.

MINOR M. DAVIS, OF NEW YORK, N. Y.

DEVICE FOR PREVENTING INDUCTION IN ELECTRICAL CONDUCTORS.

955,142.      Specification of Letters Patent.      Patented Apr. 19, 1910.

Application filed July 17, 1909. Serial No. 508,226.

*To all whom it may concern:*

Be it known that I, MINOR M. DAVIS, a citizen of the United States, residing in the city of New York, borough of Brooklyn, county of Kings, State of New York, have made certain new and useful Improvements in Devices for Preventing Induction in Electrical Conductors, of which the following is a specification.

This invention relates to a method of and means for obviating or neutralizing the evil effects of induction between separated, substantially parallel conductors.

The object of this invention, is to prevent the harmful action of conductors carrying alternating impulses of considerable strength, such as are used for power purposes, upon conductors within inductive distance of such conductors employed for signaling purposes, such as telegraphing.

The improvements consist in employing a compensating conductor in inductive relation with respect to the disturbing cause, and placing a compensating conductor in close proximity to but insulated from a conductor connected in a signaling circuit; these conductors are subject to induction from the disturbing source. This compensating conductor is caused to re-act on the circuit conductor and this re-action is graduated and established so as to compensate or neutralize the action of the disturbing source on the signaling conductor.

The improvement also consists in neutralizing induction in parallel conductors by employing as a conductor the metal sheath of the cable inclosing the signaling conductor or conductors and a parallel compensating conductor, subjecting all of these conductors to the same inductive influence, and causing the induced impulses in said compensating conductor to re-act upon the signaling conductor to substantially an equal and opposite extent as compared with the disturbing cause.

There are one or more insulated conductors in parallel relation, connected in circuit with signaling apparatus in the ordinary manner; substantially parallel with these conductors, as in the same cable, are one or more compensating conductors; these are connected in a circuit susceptible of conveying induced impulses, and for this purpose there may be used a ground return circuit, or the circuit may include a condenser in series, or otherwise. One coil of a transformer is connected in this circuit and the other coil of the transformer is connected in circuit with a conductor arranged parallel with the disturbing source, at any suitable distance therefrom; for this purpose there may be used a separate conductor or the metal sheath or armor of the cable included in a compensating circuit may be used, and the transformer is so adjusted that the compensating conductors will develop a source of alternating current having an electromotive force efficient to compensate for the inductive effect of the disturbing source. If the disturbing source extends parallel to the circuit conductors for a comparatively long distance there may be one or more compensating conductors arranged substantially parallel with the signal circuit conductors for a much shorter extent but the electromotive force, intensity or current strength is increased, graduated or adjusted so as to compensate and neutralize the effect of the disturbing cause in the circuit conductors.

The accompanying drawings illustrate the invention.

Figure 1 shows a disturbing alternating current conductor in inductive relation to a cable containing telegraph wires combined with the improvements; Fig. 2 is a modification in which a second compensating conductor performs the electrical functions of the cable sheath in Fig. 1; Fig. 3 is a modification of Fig. 2 showing a condenser in the compensating circuit; and Fig. 4 shows a group of metal sheathed cables included in a cable so that the cable sheaths constitute the compensating conductors.

In Fig. 1 there are a series of parallel, insulated cabled conductors included in the lead cable sheath $c$, the conductors $k$ are to be connected in circuit with signaling apparatus like telegraph instruments $t$, the parallel insulated conductors $w$ are compensating conductors used for compensating purposes only, they are connected together at each end and to the ground; the cable sheath $c$ is a lead pipe; this is connected, in circuit with the ground wire 20 at one terminal and the conductor 21 22, at the other terminal. There is a transformer $b$ having two coils 11 and 12 rendered adjustable by the contact points and tap wires engaged by the switch arms $s$ and $u$, the coil 12 is included in circuit with the conductor $w$, the coil 11 is included in circuit with the conductor c, which is the cable sheath, as here shown.

Impulses in the disturbing conductor d produce induced impulses in the conductors c, k and w, the effect in c being much the greater, the impulses in the conductor c induce impulses through the transformer b in the compensating conductor w, these react upon the conductors k and the effect may be made to accurately compensate by adjusting the electro-motive force of the induced impulse in the conductor w by adjusting the coil sections of the transformer b; the arms s and u being moved until the desired compensation is established.

In Fig. 2 a special conductor 10 is supported in proximity to the disturbing conductor d and connected in circuit with the coil 11 of the transformer b thus taking the place of the cable sheath c; in this case I ground the cable sheath at frequent intervals as shown at 30.

In Fig. 3 condensers m are included in the circuit of the conductor 10 and the conductor w, the object being to complete a circuit which will carry induced impulses in both cases.

In Fig. 4 there is shown a group of metal sheathed cables each cable having one or more conductors k; these cables are insulated from each other and included in a cable having a sheath c of metal as in Fig. 1. The conductors k are included in pairs or singly in conducting coverings w, and these coverings are used in such a cable for the compensating conductor w shown in Fig. 1.

In the claims the term "substantially co-extensive" has been used to described conductors of about the same linear extent though varying somewhat; and the term "substantially parallel" has been used to describe conductors having a sufficiently parallel arrangement to permit induction without limitation to the absolutely parallel arrangement of cabled conductors.

What I claim and desire to secure by Letters Patent is:

1. The herein described means for neutralizing inductive impulses due to a conductor carrying a disturbing inductive current on a signaling conductor in inductive relation thereto which consists in the combination of a compensating conductor substantially co-extensive with and parallel to the disturbing conductor, a signaling conductor, a compensating conductor substantially parallel to and co-extensive with the signaling conductor and means for establishing an inductive relation between said compensating conductors and said signaling conductor of substantially equal and opposite effect as compared with the effect of the disturbing conductor.

2. The described means for neutralizing induction due to a conductor carrying a disturbing inductive current on a series of signaling conductors arranged in a cable substantially parallel therewith, which consists in the combination with signaling conductors of an insulated metal sheath for said conductors, a compensating conductor included in said cable, a circuit including said sheath conductor and means for establishing an inductive relation between the sheath circuit and compensating conductor of substantially equal and opposite effect as compared with the effect of the disturbing conductor.

3. The described means for neutralizing the effect of inductive impulses in a conductor carrying a disturbing inductive current on a signaling conductor in inductive relation thereto, which consists in the combination of a signaling conductor, a compensating conductor substantially co-extensive with and parallel to the disturbing conductor, a compensating conductor substantially parallel to and co-extensive with the signaling conductor, and a transformer having one coil in one compensating conductor and another coil in another compensating conductor, substantially as described.

4. The herein described means for neutralizing the effect of inductive impulses in a conductor carrying a disturbing inductive current on a signaling conductor in inductive relation thereto, which consists in the combination of a signaling conductor, a compensating conductor substantially co-extensive with and parallel to the disturbing conductor, a compensating conductor substantially parallel to and co-extensive with the signaling conductor, a transformer having one coil in one compensating conductor and the other coil in the other compensating conductor and means for varying the inductive effect of one coil upon the other substantially as described.

5. The herein described means for neutralizing the effect of inductive impulses in a conductor carrying a disturbing current on a signaling conductor in inductive relation thereto, which consists in the combination of a signaling conductor; a compensating conductor in inductive relation to a disturbing conductor, a compensating conductor in inductive relation to the signaling conductor, and a variable source of electromotive force in the last-named compensating conductor.

MINOR M. DAVIS.

Witnesses:
STEWART REYNOLDS,
WILLIAM A. HAYES.